United States Patent [19]

Evans

[11] Patent Number: 4,599,620

[45] Date of Patent: Jul. 8, 1986

[54] METHOD FOR DETERMINING THE ORIENTATION OF A MOVING PLATFORM

[75] Inventor: Alan G. Evans, LaPlata, Md.

[73] Assignee: The United States of America as represented by the Secretary of the Navy, Washington, D.C.

[21] Appl. No.: 678,187

[22] Filed: Dec. 4, 1984

[51] Int. Cl.⁴ .................... G01S 5/02; H04B 7/185; G06G 7/78
[52] U.S. Cl. .................................. 343/357; 343/352; 364/434
[58] Field of Search ............... 343/352, 356, 357, 359, 343/422, 428, 449, 451, 418; 364/434

[56] References Cited

U.S. PATENT DOCUMENTS

| | | | |
|---|---|---|---|
| 2,861,264 | 11/1958 | Lair | 343/418 |
| 3,798,648 | 3/1974 | Lammers | 343/418 |
| 4,042,929 | 8/1977 | Dorey | 343/418 |
| 4,060,809 | 11/1977 | Baghdady | 343/451 |

Primary Examiner—Theodore M. Blum
Assistant Examiner—Gregory C. Issing
Attorney, Agent, or Firm—R. F. Beers; E. E. Goshorn

[57] ABSTRACT

An improved method for continuously determining the orientation of a moving user platform at a selected time fix. A Global Positioning System (GPS) is used to carry out the method and is made up of a plurality of twenty-four (24) earth-orbiting satellites wherein each satellite continuously transmits a pair of distinctively encoded RF signals. The GPS system is also provided with a computerized GPS receiver apparatus for use on a moving platform. The receiver apparatus is generally comprised of a rotatable antenna, a single channel multi-track geodetic receiver, a receiver microprocessor, and an orientation computer with a display. The receiver processor selects an optimum group of four satellites to be tracked. The orientation computer during antenna rotation selects a series of four equidistant points about the antenna periphery for receiving signals from each tracked satellite. The signals are transformed by the computer so as to provide a graphic data display output in near real time of the biased range (Doppler phase measurement) of each optimum-tracked satellite in relation to the moving platform. The biased range data of each graphic display for an optimum-tracked satellite is represented by a series of relatively spaced biased range data lines wherein any point on each line represents the biased range of the satellite in near real time. A common time fix is selected for the graphic data so that the change-in-range of each optimum-tracked satellite is analytically obtained with respect to at least one pair of diametrically opposed points of the series of four equidistant points of the antenna. The change-in-range is a function of predetermined equations so that the orientation of the rotating antenna and thus that of the platform is determined in terms of pitch, roll and yaw. By reason of the improved method for continuously determining orientation of a moving platform in relation to the earth, the method assists in accurately setting, e.g., a platform fire control system whether the platform is on or above the earth's surface.

16 Claims, 8 Drawing Figures

METHOD FOR DETERMINING THE ORIENTATION OF A MOVING PLATFORM

This invention relates to an improved method for continuously determining the orientation of a moving platform. More particularly, the invention concerns an improved method for continuously determining by use of a Global Positioning System (GPS) the orientation of a moving platform at a selected time fix in relation to the earth's ellipsoid.

BACKGROUND OF THE INVENTION

Various antenna receiver systems have been designed in the past for determining either the transmitter direction or receiver position. For example, U.S. Pat. No. 2,861,264 to Lair relates to an antenna receiver system. The system is generally comprised of a single receiver antenna that not only includes rotary motion about its axis but also harmonic motion of the antenna between two points. The system also includes a comparator circuit for determining the direction and magnitude of the source at the receiver antenna location during its compound motion upon system use. U.S. Pat. No. 3,798,648 to Lammers discloses a double antenna direction finding system. The system is provided with one antenna being movable relative to and spaced from the other so as to obtain a frequency difference that can be converted into visual information. U.S. Pat. No. 4,042,929 to Dorey relates to a ground beacon navigation system for a helicopter. The system is provided with two antennas affixed to the outer ends of the rotary blade. An electronic signal processing circuit and display arrangement is connected to the antennas for processing the received beacon signals so as to indicate the spatial coordinate position of the helicopter. U.S. Pat. No. 4,060,809 to Baghdady discloses a system having at least one ground station for tracking an airborne moving object and for determining the position of the tracked object in spatial coordinates. The ground station system is generally comprised of a pair of orthogonally related antennas that are movable in relation to each other. These antennas function to radiate signals to and for receiving signals reflected from the object being tracked. The electronic components associated with the antennas transforms the received signals into visual information of azimuth, elevation and range of the object. However, none of the aforediscussed references, whether taken alone or in any combination, remotely suggest an improved method for continuously determining the orientation of a moving platform in relation to the earth by the use of a Global Positioning System (GPS) that is provided with a computerized GPS signal receiver apparatus which is mounted on the platform and which includes a single rotary antenna. The method includes, among other things, the steps of processing the GPS satellite signals received by the platform so as to continuously track an optimum group of four satellites despite the irregular and relatively low dynamic motions of the platform about and with respect to its axis as the platform moves along such axis (heading); and then transforming the signals of the tracked satellites received by a selected series of equidistant points about the antenna periphery into a graphic display of range data of each tracked satellite that can be interpolated at a selected and common time fix for enabling the mathematical determination of platform orientation thereat.

SUMMARY OF THE INVENTION

An object of the invention is to provide an improved method for continuously determining the orientation of a moving platform by the use of a GPS system having a computerized GPS signal receiver apparatus mounted on the platform for continuously tracking the signals from an optimum group of four GPS satellites despite the relative effects of a platform moving in more than one direction.

Another object of the invention is to provide an improved method for continuously determining the orientation of a moving platform by the use of computer techniques for transforming signals of an optimum group of four tracked GPS satellites into a display of interpolated graphic range data versus near real time between the platform antenna and each optimum satellite so as to enable a mathematical solution of the platform orientation at a selected time fix in near real time.

Still another object of the invention is to provide an improved method for continuously determining the orientation of a moving platform by rotating the platform antenna at a predetermined speed so that the antenna will continuously track an optimum group of four GPS satellites within the field of view of the antenna despite movements of the platform along, about and with respect to its axis.

A summary of the invention is to provide an improved method for continuously determining the orientation of a moving platform in relation to the earth's ellipsoid whether the platform is on or above the earth. The method is carried out by a GPS that is provided with a plurality of earth-orbiting satellites. These orbiting satellites are arranged in a series of three longitudinal planes in angular relation to each other and the earth's equatorial plane. Each satellite continuously transmits a pair of encoded signals at predetermined L-band frequencies that are directed in a radial direction towards the earth's surface.

The GPS is also provided with a computerized GPS signal receiver apparatus mounted on a moving user platform. The apparatus is generally comprised of a single rotating antenna, a receiver and a receiver microprocessor. During processing of the signals of a series of GPS satellites within the field of view of the platform antenna, the receiver and its processor function to continuously track an optimum group of four satellites as the GPS satellites and underlying platform move relative to each other during invention use.

The apparatus is also provided with an orientation computer and a range data graphic display connected thereto. The computer is connected to the processor output. A device for continuously indicating the angular rotation of the antenna in relation to the platform axis is connected to the antenna and the computer. A master clock is connected to the antenna angular rotation indicating device and the receiver for synchronizing the operations of the receiver, the processor and the computer. Upon tracking an optimum group of four satellites, the computer is operated to select a series of four equidistant points about the antenna periphery. The received signals of each tracked satellite at the selected series of four antenna points are transformed by the computer into a graphic display output of more than one series of relatively spaced biased range data points of a tracked satellite with respect to near real time. The graphic display of range data points for each tracked satellite are interpolated so as to indicate the change-inrange of each satellite at a selected and common time fix in near real time with respect to each pair of diametrically opposed points of a series of four equidistant points about the antenna periphery. The pitch, roll and yaw orientation of the rotating antenna and thus of the platform is then mathematically determined by using predetermined equations that are functions of the change-in-range of each optimum-tracked satellite

DETAILED DESCRIPTION OF THE INVENTION

Figure 1:
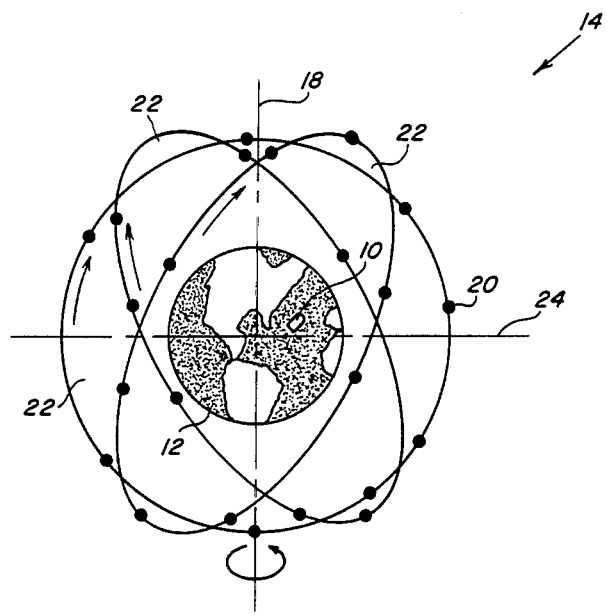
FIG. 1 is a diagrammatic view of a Global Positioning System (GPS) that embodies the present invention.
Figure 2:
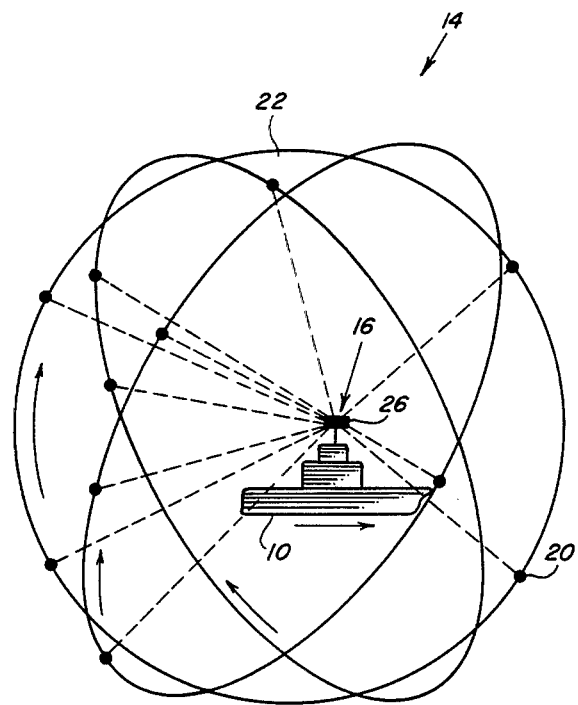
FIG. 2 is an enlarged diagrammatic view of FIG. 1 with parts added and other parts removed to further illustrate details of the invention in relation to the GPS and a moving GPS signal receiving platform.

With further reference to FIG. 1, an improved method for continuously determining the orientation of a moving user platform 10 in relation to the earth's surface 12 (ellipsoid) at a selected time fix in near real time is carried out by a Global Positioning System (GPS) 14. The GPS includes a computerized GPS signal receiver apparatus 16 which is mounted on the platform as generally indicated in FIG. 2. Although platform 10 is shown as a marine vessel in FIG. 2 it could be, for example, a rotary wing aircraft, a fixed wing aircraft with low dynamics with respect to the aircraft axis or a multi-wheeled vehicle. The earth rotates about its north-south axis 18 in the manner shown in FIG. 1. The GPS is generally made up of a plurality of twenty-four (24) earth-orbiting and relatively spaced satellites or space vehicles 20 with the plurality of 24 satellites being arranged in three groups of eight (8). Each group or constellation of 8 satellites is disposed in its respective plane 22 of a series of three longitudinal planes in relation to the earth. A satellite 20 of a given group is arranged in a nearly circular orbital path in its respective plane about the earth and in equal spaced relation to each other. A satellite in its orbital path of a plane 22 has an altitude of about 20,000 kilometers above the earth. Each plane 22 is disposed in angular and spatial relation to each of the other two planes so as to form an angle of approximately one hundred twenty (120) degrees between adjacent and intersecting planes 22. At the same time, each plane 22 is disposed in angular relation to the equatorial plane 24 so as to form an angle of about sixty-three (63) degrees therebetween. The time period of a satellite to travel in its planar orbit about the earth is approximately twelve (12) hours.

Each satellite is battery powered with solar rechargeable batteries so as to continuously transmit a pair of encoded pseudo navigation bearing signals at predetermined L-band frequencies of $L_1$ of 1227.6 megahertz (MH) and $L_2$ of 1575.42 MH. One reason for these pair of signals from each satellite is to compensate for the adverse effects of the ionosphere which would otherwise result in inaccurate determination of the biased rang between a satellite 20 and platform 10 if only one signal were transmitted by the satellite. The pair of transmitted signals of each satellite are distinctively encoded so that a platform 10 can identify the signals of each satellite within the field of view of a rotary arm antenna 26 of receiver apparatus 16.

Figure 6A:
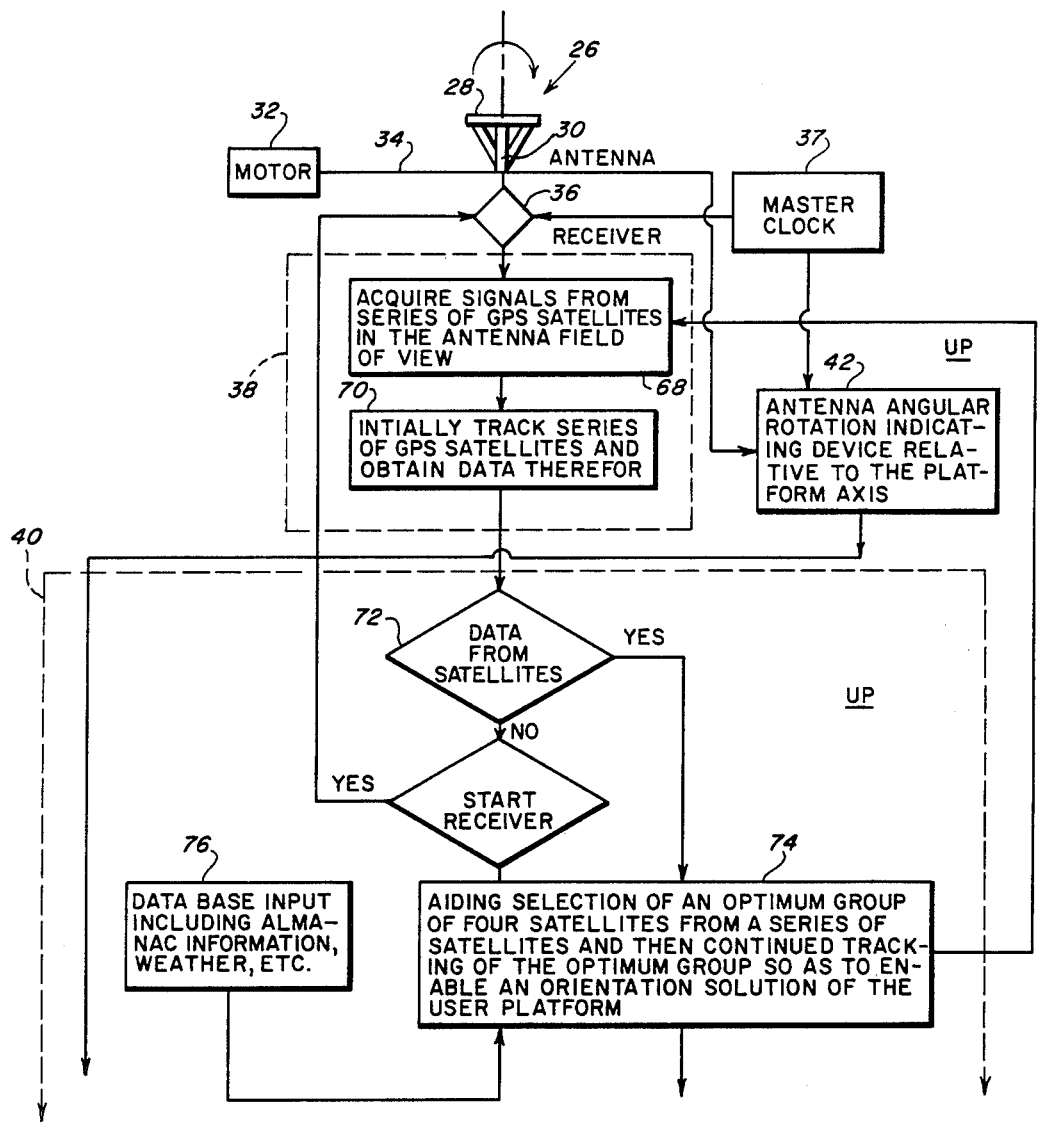
FIGS. 6A and 6B is a schematic of the flow chart for the apparatus of FIG. 5.

As best shown in FIG. 6A, the antenna is generally made up of a longitudinally extending arm 28 of a preselected length and a shaft 30 for concentrically and rotatably mounting the arm on platform 10. An electric motor 32 is provided with an output shaft 34 that is connected to the lower end of shaft 30. During operation of receiver apparatus 16, motor 32 continuously rotates arm 28 at a predetermined speed in a clockwise direction for receiving signals from a series of satellites 20 within the field of view of antenna 26 as depicted in FIG. 2.

Figure 5:
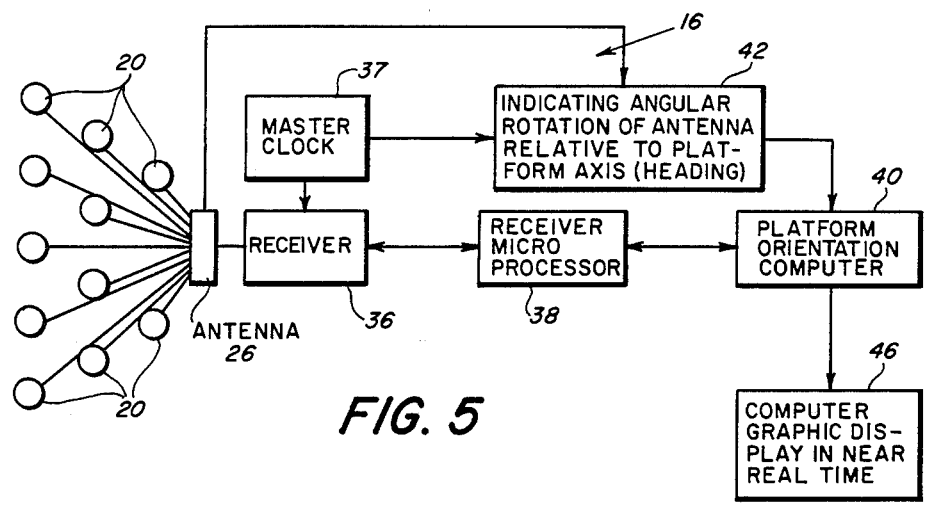
FIG. 5 is a schematic of the computerized GPS signal receiver apparatus for use on a moving platform.

A single channel geodetic receiver 36 of receiver apparatus 16 is mounted on platform 10 in an appropriate manner and is operatively connected to antenna 26 as shown in FIG. 5. A master clock 37 is connected to the receiver and generates a 10.23 MHz signal which is a multiple of the frequency of the encoded signals transmitted from each satellite 20. The receiver's single channel is multiplexed to resolve the parallel date streams of the satellite signals that are received by the antenna into a serial data stream. The receiver is also provided with a receiver microprocessor 38 that has stored therein all of the coded signals of each GPS satellite 20. By virtue of the Doppler effect and the pair of signals being transmitted from each satellite, the phase shift of the received signals from each satellite within the antenna field of view are correlated and matched with the satellite signals stored within receiver microprocessor 38. This matching by processor 38 of stored and received satellite signals not only indicates the time difference between matched signals but also the biased range (which is equal to an unknown constant plus Doppler change-in-range measurements) between each satellite of the series of satellites within the antenna field of view and platform 10 at a peripheral point about rotating antenna 26.

The output of microprocessor 38 is connected to the input of a platform orientation computer 40 of apparatus 16 as illustrated in FIG. 5. The computer includes a selectively changeable data base. The data base is changeable to compensate for, among other things, change in the ephemeris of a satellite 20, error of either clock 37 or the clock of one or more satellites 20, relativistic effects between platform 10 and any satellite, selective almanac information and local weather conditions. One advantage of computer 40 in having a selectively changeable data base is that the computer not only compensates for satellite signal propagation delays, but also clock errors. Because of the data base of the computer and the feedback from computer 40 to the receiver microprocessor, the signals of an optimum group of four satellites of the series of satellites, that were initially matched by receiver microprocessor 38, are now selected and tracked. Since the data base of computer 40 assists in minimizing the errors of signal delay, clock error, etc., the biased range between the platform and each optimum tracked satellite is determined with greater accuracy than would be the case by receiver microprocessor 38 itself. Hence, microprocessor 38 and computer 40 of receiver apparatus 16 on platform 10 in selecting an optimum group of four GPS satellites for tracking assures that the orientation of the moving platform at a selected time fix will be determined with minimal error as will become more apparent hereinafter.

As further depicted in FIG. 5, a device 42 is connected to the output of rotating antenna 26 that indicates the angular rotation of the rotating antenna in relation to the axis (heading) of moving platform 10. Master clock 37 is also connected to device 42 and functions to synchronize the operations of device 42, and computer 40.

Figure 3:
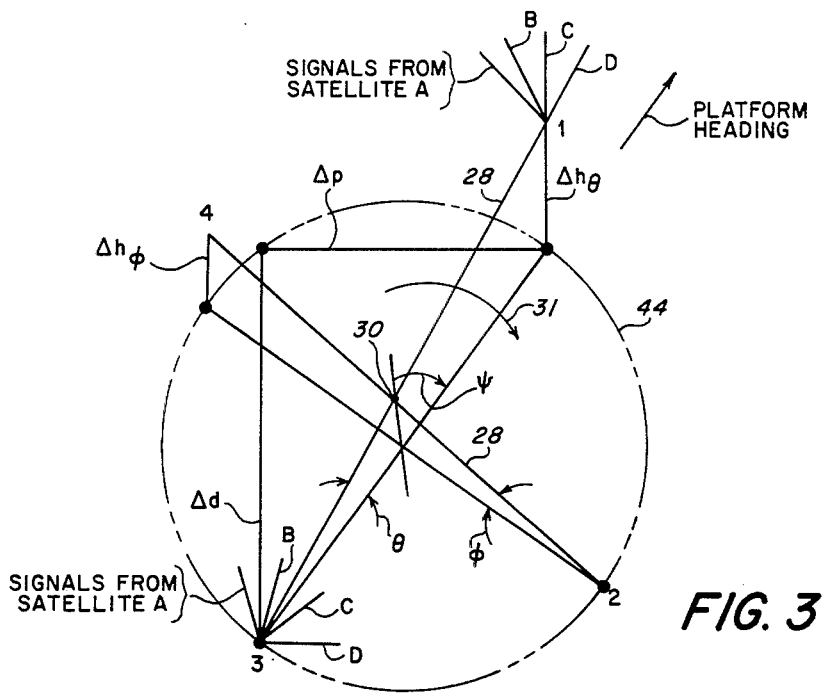
FIG. 3 is a diagrammatic view of a single rotating arm antenna of a moving platform in more than one operative position for receiving signals from a group of four optimum-tracked satellites and illustrates further details of the invention.

The outer ends of rotating arm 28 in moving in a circular and planar path have a multitude of peripheral positions for receiving signals from a group of four optimum-tracked satellites, A, B, C and D as shown in FIG. 3. Two orthogonally related operative positions of rotating arm 28 are also shown in FIG. 3. Because of movement of platform 10 in more than one direction, along, and with respect to its axis (heading), rotating antenna arm 28 is normally disposed out of and in angular relation to its reference plane as indicated by dot-dash line 44 in FIG. 3. In order to determine the orientation of platform 10 at a selected time fix, computer 40 is advantageously programmed to select a series of four equidistant peripheral points 1, 2, 3 and 4 of rotating arm 28 as it moves through its circular path. It is noted that the selected peripheral points form part of a circle within the circular path of the antenna, and with the center of the circle being coincidental with the axis of rotating shaft 30. Computer 40 is normally programmed to normally select these series of points in synchronization with the output of device 42 so that diametrically opposed points 1 and 3 of the selected series correspond to the heading of platform 10 along its axis. In order for rotating arm 28 to maintain tracking of a group of four satellites in conjunction with the movement of platform 10 along, and with respect to its axis (and with relatively low dynamics with respect thereto), the arm should have a length of about two meters and also be rotated by motor 32 at a predetermined speed of about six revolutions per second. Depending on the design of antenna 26, compensation may be necessary to account for the effects of antenna spin. Thus, the time period for each revolution of arm 28 is approximately one hundred sixty milliseconds (160 ms) or more.

Figure 4A:
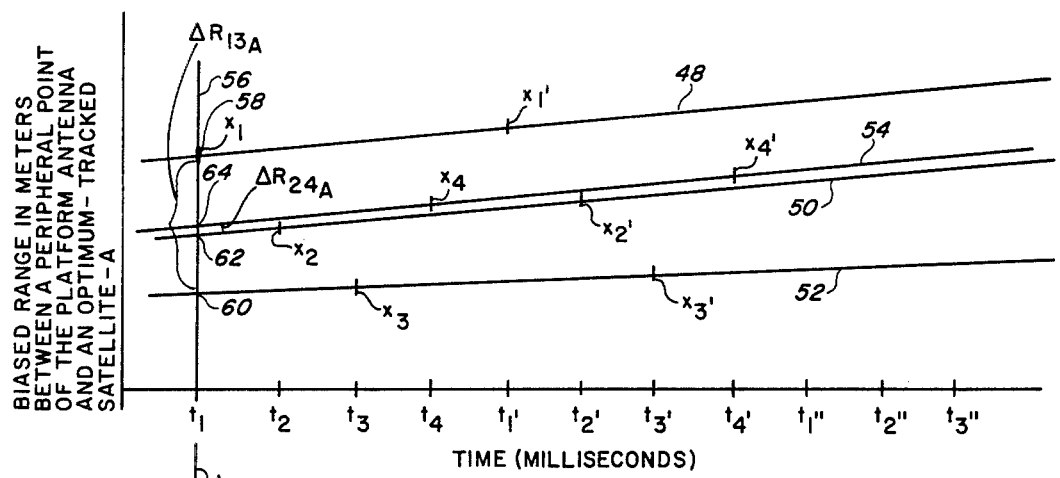
FIGS. 4A and 4B are two graphic views wherein each view indicates plotted and interpolated biased range data of an optimum-tracked satellite with respect to a rotating antenna on a moving platform.
Figure 4B:
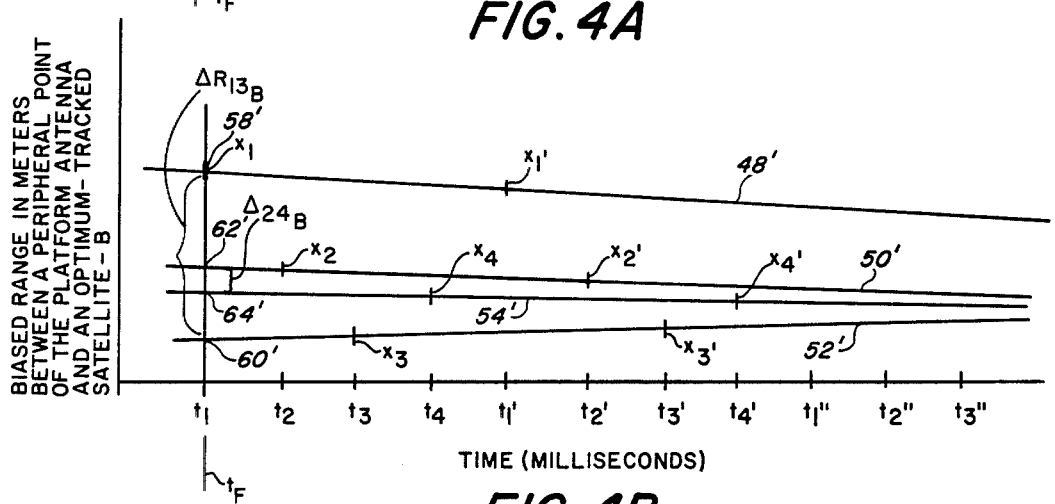

The received signal of each optimum tracked satellite A, B. C or D at any one of the selected series of four equidistant points, 1, 2, 3 and 4 of the antenna is then transformed by operation of computer 40 into a biased range data point output for each satellite. A graphic display 46 is connected to the output of computer 40 and functions to plot the range data point of each tracked satellite in near real time. As shown in FIG. 4A, a repeating but different series of four range data points X1, X2, X3, X4; and then X1', X2', X3', X4', etc., are plotted. Each data point indicates the biased range between tracked satellite A and platform 10 in near real time. In other words, as antenna arm 28 rotates on moving platform 10, each of the selected series of four equidistant antenna receiving points 1, 2, 3, 4 has a different biased range in relation to relatively moving and overlying optimum-tracked satellite A. The different biased range values are indicated by the first series of four graphically displayed range data points $X_1$, $X_2$, $X_3$, and $X_4$; the next repeating series $X_{1'}$, $X_{2'}$, $X_{3'}$, and $X_{4'}$, then the third repeating series of range data points (not shown), etc., as the antenna continuously rotates more than one revolution about its shaft 30. Thus, each series of range data points relates to the selected series of peripheral antenna points 1, 2, 3 and 4 in near real time. Similarly, as shown in FIG. 4B relatively moving optimum-tracked satellite B in a different orbital position than satellite A has a series of different biased range values in near real time as indicated by the repeating series of range data points $X_1$, $X_2$, $X_3$, $X_4$, and $X_{1'}$, $X_{2'}$, $X_{3'}$, $X_{4'}$.

If the antenna rotation is sufficiently fast with respect to the dynamics of moving platform 10, the biased range between points, for example, $X_1$ and $X_{1'}$ is nearly linear. Accordingly, a straight line 48 is drawn between these two points $X_1$ and $X_{1'}$ to obtain a loci of biased range data points of satellite A at signal receiving point 1 of antenna arm 28. Similarly, three straight lines 50, 52 and 54 are drawn between linearly related points $X_2$, $X_{2'}$; $X_3$, $X_{3'}$; and $X_4$, $X_{4'}$. As evident from FIG. 4A, a series of four relatively spaced lines 48, 50, 52 and 54 are formed wherein each line represents a loci of biased range data points at different near real times for satellite A. In other words, line 48 of FIG. 4A indicates a loci of biased range data points in near real time between satellite A and the multitude of peripheral positions of antenna point 1 as the antenna rotates on moving platform 10. As shown in FIG. 4B a series of four relatively spaced lines 48', 50', 52' and 54' are formed in similar fashion for relatively moving and optimum tracked satellite B.

In order to enable determination of the change-in-range of each satellite A, B, C or D in relation to each pair of diametrically opposed points 1 and 3 or 2 and 4 of a series of equidistant points of rotating antenna arm 28, a line 56 is formed along a selected and common time fix, $t_F$ in near real time for the graphic display of each satellite A, B, C or D. The time fix is preferably selected so that line 56 passes through range data point $X_1$, which corresponds to the heading of platform 10 as indicated in FIGS. 4A and 4B. For the sake of simplicity, separate graphic displays of satellites C and D are not shown. Line 56 intersects range data lines 48 and 52 at common points 58 and 60 and also intersects range data lines 50 and 54 at common points 62 and 64 all as illustrated in FIG. 4A. By analytically determining the difference between common points 58 and 60, and 62 and 64 the change-in-range of satellite A is determined at time fix, $t_F$ in relation to diametrically opposed peripheral points 1 and 3, and 2 and 4 of rotating antenna arm 28. Similarly, the change-inrange of satellite B between common points 58' and 60' and 62' and 64' is also determined.

It has been found that the change-in-range of a satellite can be mathematically expressed by the following equation:

$$R = \text{cosine } Az(t_F) \text{ cosine } E(t_F)\Delta d + \text{sine } Az(t_F) \text{ cosine } E(t_F)\Delta p + \text{sine } E(t_F)\Delta h$$

where:
 ΔR is the analytically determined change-in-range of a satellite A, B, C or D in relation to interpolated points 58 and 60 or 62 and 64.
 Az is the azimuth of a satellite A, B, C or D which is the angular orientation of a satellite with respect to the north direction of the geodetic coordinate frame as viewed from an antenna arm position on the platform at $t_F$.

E is the elevation which is the angle of a satellite A, B, C or D above the horizon as viewed from the antenna arm position at $t_F$.

$\Delta d$ is the change in longitude for $\Delta R$ of pair of diametrically opposed points 1 and 3 or 2 and 4 of the antenna arm that relate to graphically displayed pair of points, for example, 58 and 60 or 62 and 64.

$\Delta p$ is the change in latitude for $\Delta R$ of a pair of diametrically opposed points 1 and 3 or 2 and 4 of the antenna arm that relate to graphically displayed pair of points, for example, 58 and 60 or 62 and 64.

$\Delta h$ is the change in elevation for $\Delta R$ of a pair of diametrically opposed points 1 and 3 or 2 and 4 of the antenna arm in relation to its reference plane 44.

With further reference to FIG. 3 the terms $\Delta d$, $\Delta p$ and $\Delta h$ are indicated in relation to a pair of diametrically opposed points 1 and 3 of arm 28 while the term $\Delta h$ is only indicated for the pair of diametrically opposed points 2 and 4 of the antenna arm. Since the elevation, E (altitude) position of each optimum-tracked satellite A, B, C or D is known at $t_F$, the four unknowns Az, $\Delta d$, $\Delta p$ and $\Delta h$ of the aforementioned $\Delta R$ equation for each satellite A, B, C, and D are readily determined at diametrically opposed points 1 and 3 of the antenna arm at $t_F$.

Since the orientation of the rotating antenna arm indicates the orientation of the platform, it is normally expressed in terms of yaw, pitch and roll for a given selected time fix in near real time. Accordingly, yaw is expressed by the following equation:

$$\psi = \pi - \sin^{-1} \frac{\Delta p}{\text{arm } 28 \cos \theta}$$

Pitch is expressed by the following equation:

$$\theta = \sin^{-1} \frac{\Delta h \theta}{\text{arm } 28}$$

Roll is expressed by the following equation:

$$\phi = \sin^{-1} \frac{\Delta h \phi}{\text{arm } 28}$$

The terms of the above equations $\psi$, $\Theta$, $\phi$, $\Delta h\Theta$, $\Delta h\phi$ and $\Delta p$ are also graphically illustrated in FIG. 3. Since the length of arm 28 is known and since $\Delta p$ and $\Delta h$ are determined by the $\Delta R$ equation, it is evident that the equations for $\psi$, $\Theta$ and $\phi$ are readily solvable.

Figure 6B:
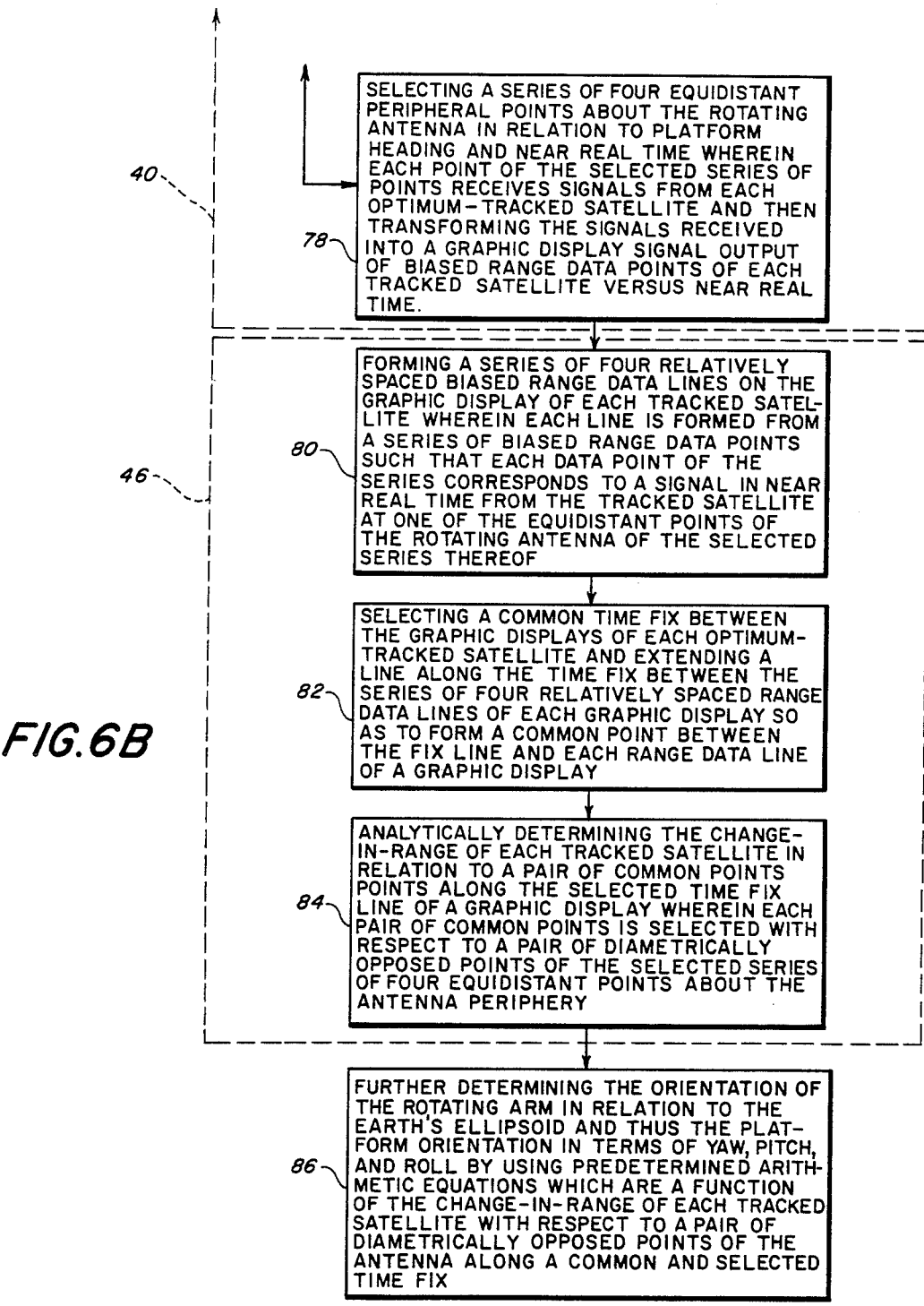

A flow chart of the operative relationship between processor 38, computer 40, and display 46 is illustrated in FIGS. 6A, and 6B. When signals from a series of satellites 20 are received by receiver 36 from rotating antenna 26, they are first multiplexed into an overall serialized data stream. The encoded and stored data streams of processor 38 are driven by the clock 37 and matched with the initially tracked and incoming signals from the series of satellites within the field of view of antenna 26 as indicated by block 70.

When GPS satellite signal data is being received from the output of receiver processor 38, block 72 of computer 40 provides a "Yes" output to block 74. Block 76 furnishes up-to-date information to Block 74, such as, for example, local weather conditions As the result of block 74 comparing the information from block 76 with the data from block 70, block 74 sends an output to block 68 for selecting and tracking an optimum group of four relatively moving satellites from the series of GPS satellites signals being received by receiver 36. With blocks 68 and 70 now functioning to track the optimum group of four satellites and with block 74 providing a output indicative of the signals received from the optimum tracked satellites, block 78 functions to synchronize the receiver measurements to the times at which the antenna arm is at the selected series of points for receiving the signals. The selection is preferably such that diametrically opposed points 1 and 3 substantially correspond to the heading of platform 10.

At block 80, a series of relatively spaced biased range data lines are appropriately formed on each graphic display of a tracked satellite, for example, lines 48, 50, 52 and 54 of satellite A in FIG. 4A. Then at block 82, an appropriate common time fix, $t_F$ is selected between each of the graphic displays and then a line is extended along the fix between the series of four relatively spaced range data lines of each graphic display. The time fix is preferably selected so that line 56 in FIG. 4A determines points 58 and 60 in relation to diametrically opposed points 1 and 3 of antenna arm 20 and with the arm points 1 and 3 being aligned with the platform heading. At block 84, the change-in-range is analytically determined between each pair of two pairs of common points for each graphic display, for example, the change-in-range between each pair of points 58 and 60, and 62 and 64 of FIG. 4A. Then as the result of finding the change-in-range values at block 84, the operator at block 86 mathematically determines, in accordance with the aforementioned equations, the orientation of platform 10 at a selected and common time fix $t_F$ in near real time.

Obviously, many modifications and variations of the present invention are possible in light of the above teachings. It is therefore to be understood that, within the scope of the appended claims, the invention may be practiced otherwise than as specifically described.

What is claimed is:

1. A method for continuously determining the orientation of a moving user platform at a selected time fix and in relation to the earth's ellipsoid, the platform being generally comprised of a rotating antenna, a receiver and processor means; the antenna being connected to the receiver and the processor means being operatively associated with the receiver, the method comprising the steps of:

continuously transmitting encoded RF signals from a plurality of Global Positioning System (GPS) earth-orbiting satellites, such that the transmitted RF signals of each GPS earth-orbiting satellite are a pair of encoded RF signals at predetermined frequencies that are directed in a radial direction towards the earth's surface, all GPS satellites of the plurality of satellites progressively and continuously advancing in their respective orbits about the earth in relation to the moving user platform;

continuously processing the encoded RF signals of a series of GPS satellites of the plurality thereof wherein the series of satellites are in the field of view of the antenna and wherein the signals of the satellites of the series are received by the antenna so that the receiver and processor means select and continuously track the signals of an optimum group of four satellites of the series, selecting a series of four equidistant peripheral points about the rotating antenna and at the same time receiving signals from each optimum-tracked satellite so as to obtain a plurality of graphically-displayed biased range data points for each optimum-tracked satellite wherein a graphically displayed range data point of an optimum-tracked satellite indicates a biased range of the optimum-tracked satellite with respect to one of the equidistant peripheral points of the series thereof, forming a series of four relatively spaced lines in relation to the graphically displayed biased range data points for each optimum-tracked satellite, wherein each line of the series extends between at least two biased range data points of the graphic display of an optimum-tracked satellite where two such data points are with respect to signals received from the optimum-tracked satellite at the same point of the selected series of equidistant points, selecting a common time fix in near real time between the graphic displays of each optimum-tracked satellite and then extending a line along the common time fix between the series of spaced lines of each graphic display so as to define a common point between the common time fix line and each spaced line of a graphic display.

analytically determining by interpolation the change-in-range of each optimum-tracked satellite with respect to at least one pair of diametrically opposed points of a series of four equidistant peripheral points about the antenna by selecting a pair of common points of the graphic display of an optimum-tracked satellite wherein the selected pair of common points relates to one pair of diametrically-opposed points of the series of four equidistant points about the antenna, and wherein the difference between the selected pair of common points indicates the change-in-range of the optimum-tracked satellite of a graphic display with respect to the associated pair of diametrically opposed points of the antenna, and further determining the pitch, roll, and yaw of the rotating antenna at the selected time fix in relation to a reference plane of the antenna by using predetermined arithmetic equations that are functions of the change-in-range of each optimum-tracked satellite so as to indicate the orientation of the platform at the selected time fix.

2. A method as in claim 1 wherein the antenna is comprised of a rotating arm concentrically disposed about the antenna axis, and wherein the rotating arm has a rotation about the antenna axis on the order of six revolutions per second.

3. A method as in claim 1 wherein the antenna is made up of a rotating arm, and wherein the arm has a diameter on the order of two meters.

4. A method as in claim 1 wherein the receiver is a single channel multi-track receiver.

5. A method as in claim 1 wherein the antenna is made up of a rotating arm, and wherein the path of movement of the rotating arm lies in a single plane.

6. A method as in claim 1 in which each satellite of said GPS transmits the pair of encoded RF signals at predetermined L-band frequencies of 1227.6 megaHertz and 1575.42 megaHertz.

7. A method as in claim 1 in which the platform is mounted on a marine vessel.

8. A method as in claim 1 in which the platform is mounted on an aircraft.

9. A method as in claim 1 wherein the plurality of GPS satellites are comprised of twenty-four satellites with the plurality of satellites being arranged in three separate groups of eight, each group being disposed in its respective longitudinal plane in relation to the earth, each longitudinal plane being one of a series of three longitudinal planes and also being arranged in spaced angular relation to the other longitudinal planes of the series and the equatorial plane of the earth; and with the satellites of each group of eight moving in a common approximately circular orbital path in their respective longitudinal plane.

10. A method as set forth in claim 9 wherein immediately adjacent longitudinal planes of the series of longitudinal planes define an angle of approximately 120° therebetween.

11. A method as set forth in claim 9 wherein each longitudinal plane of the series and the earth equatorial plane define an angle of approximately 63° therebetween.

12. A method as set forth in claim 11 wherein each satellite of the GPS is disposed at an altitude of approximately 20,000 kilometers above the earth's surface.

13. A method as set forth in claim 9 wherein the group of satellites in each longitudinal plane of the series are equally spaced from each other along their orbital path.

14. A method as set forth in claim 9 wherein each satellite orbits about the earth in approximately twelve (12) hours.

15. A method as set forth in claim 1 wherein the step of selecting a series of four equidistant points of the antenna is effected by an orientation computer connected to the processor means.

16. A method as set forth in claim 1 wherein the step of further determining the pitch, roll and yaw is effected by use of the following equation:

$$\Delta R = \text{cosine } Az(t_F) \text{ cosine } E(t_F)\Delta d + \\ \text{sine } Az(t_F) \text{ cosine } E(t_F)\Delta p + \text{sine } E(t_F)\Delta h.$$

* * * * *